US011177996B2

(12) United States Patent
Huang et al.

(10) Patent No.: US 11,177,996 B2
(45) Date of Patent: Nov. 16, 2021

(54) TRAINING A SOFTWARE AGENT TO CONTROL A COMMUNICATION NETWORK

(71) Applicant: Telefonaktiebolaget LM Ericsson (publ), Stockholm (SE)

(72) Inventors: Vincent Huang, Sollentuna (SE); Roberta Daidone, San Giuliano Terme (IT); Tobias Ley, Täby (SE); Martha Vlachou-Konchylaki, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 16/498,680

(22) PCT Filed: Apr. 4, 2017

(86) PCT No.: PCT/EP2017/057993
§ 371 (c)(1),
(2) Date: Sep. 27, 2019

(87) PCT Pub. No.: WO2018/184666
PCT Pub. Date: Oct. 11, 2018

(65) Prior Publication Data
US 2020/0044909 A1    Feb. 6, 2020

(51) Int. Cl.
*G06F 15/173* (2006.01)
*H04L 12/24* (2006.01)
(Continued)

(52) U.S. Cl.
CPC .......... *H04L 41/046* (2013.01); *G06N 7/005* (2013.01); *G06N 20/00* (2019.01);
(Continued)

(58) Field of Classification Search
CPC ... H04L 41/046; H04L 12/4641; H04L 41/16; H04L 67/1095; G06N 20/00; G06N 7/005
See application file for complete search history.

(56) References Cited

U.S. PATENT DOCUMENTS

| 2017/0279839 A1* | 9/2017 | Vasseur | G06F 17/18 |
| 2017/0373938 A1* | 12/2017 | Raether | H04L 41/0816 |
| 2018/0032373 A1* | 2/2018 | Chen | G06F 9/5038 |

OTHER PUBLICATIONS

Notification of Transmittal of International Search Report and Written Opinion for PCT International Application No. PCT/EP2017/057993 dated Dec. 22, 2017.
(Continued)

*Primary Examiner* — Padma Mundur
(74) *Attorney, Agent, or Firm* — Sage Patent Group

(57) ABSTRACT

A method for training a Software Agent to control a communication network is disclosed. The method comprises initialising a training network slice within the communication network, instantiating within the training network slice a cloned version of at least one Virtualised Network Function (VNF) comprised within a production network slice, mirroring traffic incoming to the VNFs of the production network slice and forwarding the mirrored traffic to the training network slice. The method further comprises causing a training instance of the Software Agent to execute a Reinforcement Learning algorithm on the training network slice, and transferring knowledge acquired by the training instance of the Software Agent to a production instance of the Software Agent.
Also disclosed are an apparatus and a computer program configured to carry out methods for training a Software Agent to control a communication network.

20 Claims, 10 Drawing Sheets

(51) Int. Cl.
*G06N 20/00* (2019.01)
*G06N 7/00* (2006.01)
*H04L 12/46* (2006.01)
*H04L 29/08* (2006.01)

(52) U.S. Cl.
CPC .......... *H04L 12/4641* (2013.01); *H04L 41/16* (2013.01); *H04L 67/1095* (2013.01)

(56) References Cited

OTHER PUBLICATIONS

Barrett et al., "Applying reinforcement learning towards automating resource allocation and application scalability in the cloud," Concurrency and Computation: Practice and Experience, vol. 25, No. 12, May 30, 2012, pp. 1656-1674.

\* cited by examiner

TRAINING A SOFTWARE AGENT TO CONTROL A COMMUNICATION NETWORK

CROSS REFERENCE TO RELATED APPLICATION

This application is a 35 U.S.C. § 371 national stage application of PCT International Application No. PCT/EP2017/057993, filed on Apr. 4, 2017, the disclosure and content of which is incorporated herein by reference in its entirety.

TECHNICAL FIELD

The present disclosure relates to a method for training a Software Agent to control a communication network. The present disclosure also relates to apparatus for training a Software Agent to control a communication network and to a computer program and a computer program product configured, when run on a computer to carry out methods for training a Software Agent to control a communication network.

BACKGROUND

Reinforcement learning is a technology to develop self-learning Software Agents, which agents can learn and optimise a policy for controlling a system or environment based on observed states of the environment and a reward system that is tailored towards achieving a particular goal. When executing a Reinforcement learning algorithm, a software agent receives an observation Ot from the environment in which it is operating, the observation enabling the software agent to determine a State St of the environment. On the basis of the State of the environment, the software agent selects an Action to be performed on the environment and, once the Action has been carried out, receives a Reward rt generated by the Action. The software agent selects Actions on the basis of environment States with the aim of maximising the expected future Reward. A Reward function may be defined such that a greater Reward is received for Actions that result in the environment entering a state that approaches a target end state for the environment, consistent with an overall goal of an entity managing the environment. On the basis expected future Rewards, a Value function Vt for each State can be calculated and an optimal policy π that maximizes the long term Value function can be derived. The policy π guides the selection of Actions by the software agent by providing a mapping from a State of the environment and an Action which may be performed by the software agent on the environment to a probability that the software agent will select the Action when the environment is in the State.

In Reinforcement learning, a software agent acts on an environment that is initially unknown, and unrepresented by a model. The software agent interacts with the environment to learn a Value function and optimise a policy applied in the learning. This may be contrasted with the concept of Planning, according to which a model of an environment is available, and a software agent may perform computations using the model to optimise a policy without any interaction with the live environment. A prediction function may be used in the Planning concept to evaluate a future state of a modelled environment, given a particular policy, while a control function may be used to find the most effective policy for optimising a future state of the modelled environment.

When a model of an environment is not available, Reinforcement learning may be used to find an optimal policy for controlling that environment. However, owing to the need to interact with the live environment, the learning process may have negative consequences for the environment, while an optimised policy is being discovered. The software agent performing reinforcement learning must therefore balance exploitation of the environment against the need to explore options for the environment's control. An exploitation strategy implements a policy based on previous learning, with the sole purpose of maximising Reward. In contrast, an exploration strategy searches for better policies using decisions not explored previously. Exploration may create opportunities by discovering higher Rewards on the basis of previously untried Actions. However, exploration also carries the risk that previously unexplored decisions will not provide increased reward and may instead have a negative impact on the controlled environment. This negative impact may only be short term or may persist, for example if the explored actions place the environment in an undesirable state from which it does not recover. In model-free, real-time, service-critical systems (including for example telecommunication systems) executing exploration strategies on the live system can have an unacceptable negative impact on service quality, and alternative methods for learning an optimal policy for control of the system are therefore desirable.

In order to create a realistic model of a live system to allow for offline training of a software agent, a large number of training samples is needed. These training samples include system States, Actions and consequent Rewards. Generating these training samples requires exploration on a live system, with the above discussed risk of negative impacts, and this is not therefore an acceptable alternative to simply training the software agent on a live system. Another option is to create a representation of the real environment for training, but this requires a high level of domain knowledge, substantial engineering work and, being an approximation, may fail to represent the real environment accurately, especially in unforeseen scenarios and extreme cases like system failure.

SUMMARY

It is an aim of the present disclosure to provide a method and apparatus which facilitate the training of a Software Agent to control a communication network.

According to a first aspect of the present disclosure, there is provided a method for training a Software Agent to control a communication network, the communication network comprising a plurality of Virtualised Network Functions (VNFs). The method comprises initialising a training network slice within the communication network, instantiating within the training network slice a cloned version of at least one VNF comprised within a production network slice of the communication network and mirroring traffic incoming to the VNFs of the production network slice, and forwarding the mirrored traffic to the training network slice. The method further comprises causing a training instance of the Software Agent to execute a Reinforcement Learning algorithm on the training network slice during a training episode, and transferring knowledge acquired by the training instance of the Software Agent during the training episode to a production instance of the Software Agent.

According to examples of the present disclosure, a VNF comprises an implementation of a network function which is decoupled from the underlying hardware, and thus may be deployed in any appropriate hardware environment, such as a data center. A network function is a communication network building block having well defined external interfaces and functional behaviour.

According to examples of the present disclosure, the method may further comprise instantiating a plurality of training network slices.

According to examples of the present disclosure, causing a training instance of the Software Agent to execute a Reinforcement Learning algorithm on the training network slice may comprise causing a training instance of the Software Agent to apply a policy of a Reinforcement Learning algorithm to the training network slice. According to examples of the present disclosure, a policy applied by the training instance of the Software Agent may comprise a mapping from a State of the training network slice and an Action which may be performed by the instance on the training network slice to a probability that the instance will select the Action when the training network slice is in the State. The Reinforcement Learning algorithm may adapt the policy as the training episode continues, in order to identify an optimal policy.

According to examples of the present disclosure, the training network slice may contain all or just some of the VNFs of the production slice, and traffic mirroring may be conducted at appropriate interfaces for the VNFs which have been cloned to the training network slice. According to examples of the present disclosure, the traffic mirroring may be continuous over the training episode.

According to examples of the present disclosure, the method may further comprise causing the production instance of the Software Agent to execute a Reinforcement Learning algorithm on the production network slice of the communication network using the transferred knowledge.

According to examples of the present disclosure, instantiating within the training network slice a cloned version of at least one VNF comprised within a production network slice of the communication network may comprise instantiating within the training network slice at least one VNF having the same function, the same software version and the same configuration as a VNF in the production network slice. According to examples of the present disclosure, the cloned VNF may additionally operate on the same data set as the VNF in the production slice.

According to examples of the present disclosure, causing a training instance of the Software Agent to execute a Reinforcement Learning algorithm on the training network slice during a training episode may comprise establishing a State of the training network slice, selecting an Action to be performed on the training network slice as a function of the established state, and causing the Action to be performed on the training network slice. Selecting an Action to be performed on the training network slice as a function of the established state may comprise selecting an Action from a set of Actions available to the Software Agent.

According to examples of the present disclosure, States of the training network slice may include information about the health of the system, including system performance indicators such as traffic load (data throughput, signalling traffic, packet delay and jitter), service indicators (number of dropped calls, number of dropped packets, quality of service parameters), resource usage (buffer queue size, number of used processing units, size and number of virtual machines, CPU and memory load) or other indicators. Example Actions may be resource related including increase/decrease of resource allocation such as CPU, Memory, number and size of virtual machines, number of processing boards etc. Example Actions may also include blocking/de-blocking, throttling, quality of service parameter changes, configuration changes, movement of traffic, subscribers, virtual machines or other actions.

According to examples of the present disclosure, causing a training instance of the Software Agent to execute a Reinforcement Learning algorithm on the training network slice during a training episode may comprise using an epsilon factor when executing the Reinforcement Learning algorithm on the training network slice. The epsilon factor may define a probability with which the Software Agent will select a random Action to be performed on a system being controlled by the Software Agent, as opposed to an Action determined from previous learning to provide a highest Reward given the current State of the system. According to examples of the present disclosure, the epsilon factor may be a non-zero epsilon factor.

According to examples of the present disclosure, Reward, as defined by a reward function, indicates the incentive that the Software Agent receives for its different Actions. The reward function may support the ultimate goal (business goal or technical goal) of a communication network operator and may be Limit based: for example, to keep to a Service Level Agreement (SLA) or operate on/over/under a certain limit, Optimization based: for example, to minimize resource usage, minimize energy usage, optimize capacity or optimize distribution, or may in some examples be time based, reaching a certain score.

According to examples of the present disclosure, causing a training instance of the Software Agent to execute a Reinforcement Learning algorithm on the training network slice during a training episode may further comprise determining an upper threshold for acceptable values of an epsilon factor for use in controlling the production network slice of the communication network, and using an epsilon factor above the determined threshold value when executing the Reinforcement Learning algorithm on the training network slice. In some examples of the present disclosure, control of the production network slice of the communication network may be effected without the use of an epsilon factor, representing an exploitation only strategy for controlling the production network slice, seeking only to maximise expected future Reward. In other examples, under certain circumstances, a small amount of exploration may be tolerated, and thus a small value epsilon may be used. The upper threshold for acceptable values of an epsilon factor for use in controlling the production network slice may represent a limit on the potential negative impact of exploration using the epsilon factor. In the training network slice, in which negative impact on slice performance does not need to be taken into account, an epsilon factor considerably higher than the determined threshold may be used, enabling faster and more aggressive exploration.

According to examples of the present disclosure, causing a training instance of the Software Agent to execute a Reinforcement Learning algorithm on the training network slice during a training episode may comprise checking for occurrence of a trigger event and, on occurrence of the trigger event, applying a jumping factor within the training network slice. Applying a jumping factor within the training network slice may comprise causing a change of configuration within the training network slice which change extends beyond the scope of any one Action in a set of Actions available to the Software Agent.

According to examples of the present disclosure, the change of configuration caused by the jumping factor may be achievable through repeated application of Actions available to the Software Agent or may be unachievable using Actions alone. According to examples of the present disclosure, example configuration changes that may be caused by the jumping factor may include instantiating another VNF or a different VNF, pooling VNFs, creating another Virtual Machine (VM), changing VM configuration (for example, scaling up/down CPU or memory) etc.

According to examples of the present disclosure, the trigger event may comprise a change in the value of any State parameter that is greater than a threshold value. According to examples of the present disclosure, the threshold value may be a percentage value for example 10%.

According to examples of the present disclosure, the method may further comprise, during the training episode, adjusting at least one of a characteristic or configuration of the training network slice to cause the training network slice to enter a target training state.

According to examples of the present disclosure, the target training state may comprise a state following occurrence of a stressor event. According to examples of the present disclosure, the stressor event may include a failure event or an abnormal traffic event including for example link breaks, buffer overflow, node restart, and/or function failure.

According to examples of the present disclosure, transferring knowledge acquired by the training instance of the Software Agent during the training episode to a production instance of the Software Agent may comprise comparing a measure of a policy applied by the training instance of the Software Agent to the same measure of a policy applied by the production instance of the Software Agent, and, if the comparison indicates that the policy applied by the training instance of the Software Agent represents an improvement over the policy applied by the production instance of the Software Agent, updating the policy applied by the production instance of the Software Agent to reflect that applied by the training instance of the Software Agent. According to examples of the present disclosure, a policy applied by an instance of the Software Agent may comprise a mapping from a State of the system controlled by the instance and an Action which may be performed by the instance on the system to a probability that the instance will select the Action when the system is in the State.

According to examples of the present disclosure, the feature "execute a Reinforcement Learning algorithm on the production network slice of the communication network using the transferred knowledge" may comprise executing a Reinforcement Learning algorithm on the production network slice using a policy updated according to the preceding example. According to examples of the present disclosure, the measure of the policy function may be a Value function as defined in examples below.

According to examples of the present disclosure, the method may further comprise establishing a representative Value Function of the training network slice and a representative Value Function of the production network slice and comparing the representative Value Function of the training network slice to the representative Value Function of the production network slice. The method may further comprise, if the representative Value Function of the training network Slice is less than the representative Value Function of the production network slice, and the difference between the representative Value Functions is greater than a reset threshold, performing at least one of resetting configuration and characteristics of the training network slice to match current configuration and characteristics of the production network slice, or terminating the training network slice, initialising a new training network slice within the communication network, instantiating within the new training network slice a cloned version of at least one VNF comprised within the production network slice, mirroring traffic incoming to the VNFs of the production network slice and forwarding the mirrored traffic to the new training network slice.

According to examples of the present disclosure, the method may further comprise establishing a representative Value Function of the training network slice and a representative Value Function of the production network slice and comparing the representative Value Function of the training network slice to the representative Value Function of the production network slice. The method may further comprise, if the representative Value Function of the training network Slice is greater than the representative Value Function of the production network slice and the difference between the representative Value Functions is greater than a switch threshold, performing at least one of resetting configuration and characteristics of the production network slice to match current configuration and characteristics of the training network slice, or replacing the production network slice with the training network slice, initialising a new training network slice within the communication network, instantiating within the new training network slice a cloned version of at least one VNF comprised within the new production network slice, mirroring traffic incoming to the VNFs of the new production network slice and forwarding the mirrored traffic to the new training network slice.

According to examples of the present disclosure, a Value Function of a network slice may comprise an indication of cumulative expected Reward given the current State of the network slice and a policy applied by an instance of the Software Agent controlling the network slice.

According to examples of the present disclosure, cumulative expected reward may be estimated over a time window which may vary according to use case, for example from hours to days.

According to examples of the present disclosure, the Value Function of a network slice, and particularly of the training network slice, may be unstable, varying considerably as exploration of the training network slice is performed. Establishing a representative Value Function of a network slice may therefore comprise comparing an instantaneous Value Function with at least one previous Value Function, establishing a trend from the compared value functions, establishing a converged Value Function from the trend, and setting the converged Value Function as the representative Value Function.

According to examples of the present disclosure, the method may further comprise, on termination of the training episode, performing at least one of resetting configuration and characteristics of the training network slice to match current configuration and characteristics of the production network slice, or terminating the training network slice, initialising a new training network slice within the communication network, instantiating within the new training network slice a cloned version of at least one VNF comprised within the production network slice, mirroring traffic incoming to the VNFs of the production network slice and forwarding the mirrored traffic to the new training network slice.

According to another aspect of the present disclosure, there is provided a computer program comprising instructions which, when executed on at least one processor, cause the at least one processor to carry out a method according to any one of the preceding aspects and/or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided apparatus for training a Software Agent to control a communication network, the communication network comprising a plurality of Virtualised Network Functions (VNFs). The apparatus comprises a processor and a memory, the memory containing instructions executable by the processor such that the apparatus is operable to initialise a training network slice within the communication network and instantiate within the training network slice a cloned version of at least one VNF comprised within a production network slice of the communication network. The apparatus is further operative to mirror traffic incoming to the VNFs of the production network slice, and forwarding the mirrored traffic to the training network slice, cause a training instance of the Software Agent to execute a Reinforcement Learning algorithm on the training network slice during a training episode, and transfer knowledge acquired by the training instance of the Software Agent during the training episode to a production instance of the Software Agent.

According to examples of the present disclosure, the apparatus is further operable to carry out a method according to any one of the preceding aspects and/or examples of the present disclosure.

According to another aspect of the present disclosure, there is provided apparatus for training a Software Agent to control a communication network, the communication network comprising a plurality of Virtualised Network Functions (VNFs). The apparatus is adapted to initialise a training network slice within the communication network and instantiate within the training network slice a cloned version of at least one VNF comprised within a production network slice of the communication network. The apparatus is further adapted to mirror traffic incoming to the VNFs of the production network slice, and forwarding the mirrored traffic to the training network slice, cause a training instance of the Software Agent to execute a Reinforcement Learning algorithm on the training network slice during a training episode, and transfer knowledge acquired by the training instance of the Software Agent during the training episode to a production instance of the Software Agent.

According to examples of the present disclosure, the apparatus is further adapted to carry out a method according to any one of the preceding aspects and/or examples of the present disclosure.

According to another aspect of the present disclosure, there is provided apparatus for training a Software Agent to control a communication network, the communication network comprising a plurality of Virtualised Network Functions (VNFs). The apparatus comprises a training module for initialising a training network slice within the communication network and instantiating within the training network slice a cloned version of at least one VNF comprised within a production network slice of the communication network. The apparatus further comprises a traffic module for mirroring traffic incoming to the VNFs of the production network slice, and forwarding the mirrored traffic to the training network slice, and a control module for causing a training instance of the Software Agent to execute a Reinforcement Learning algorithm on the training network slice during a training episode, and for transferring knowledge acquired by the training instance of the Software Agent during the training episode to a production instance of the Software Agent.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide a method for training a Software Agent to control a communication network, which method enables extensive exploration to be carried out by the Software Agent without negatively impacting the communication network. Aspects of the present disclosure thus avoid the need to balance exploitation against exploration when performing reinforcement learning, by using a training network slice for training the Software Agent, the training network slice containing a cloned version of at least one Virtualised Network Function (VNF) found in a corresponding production slice of the network.

Figure 1:
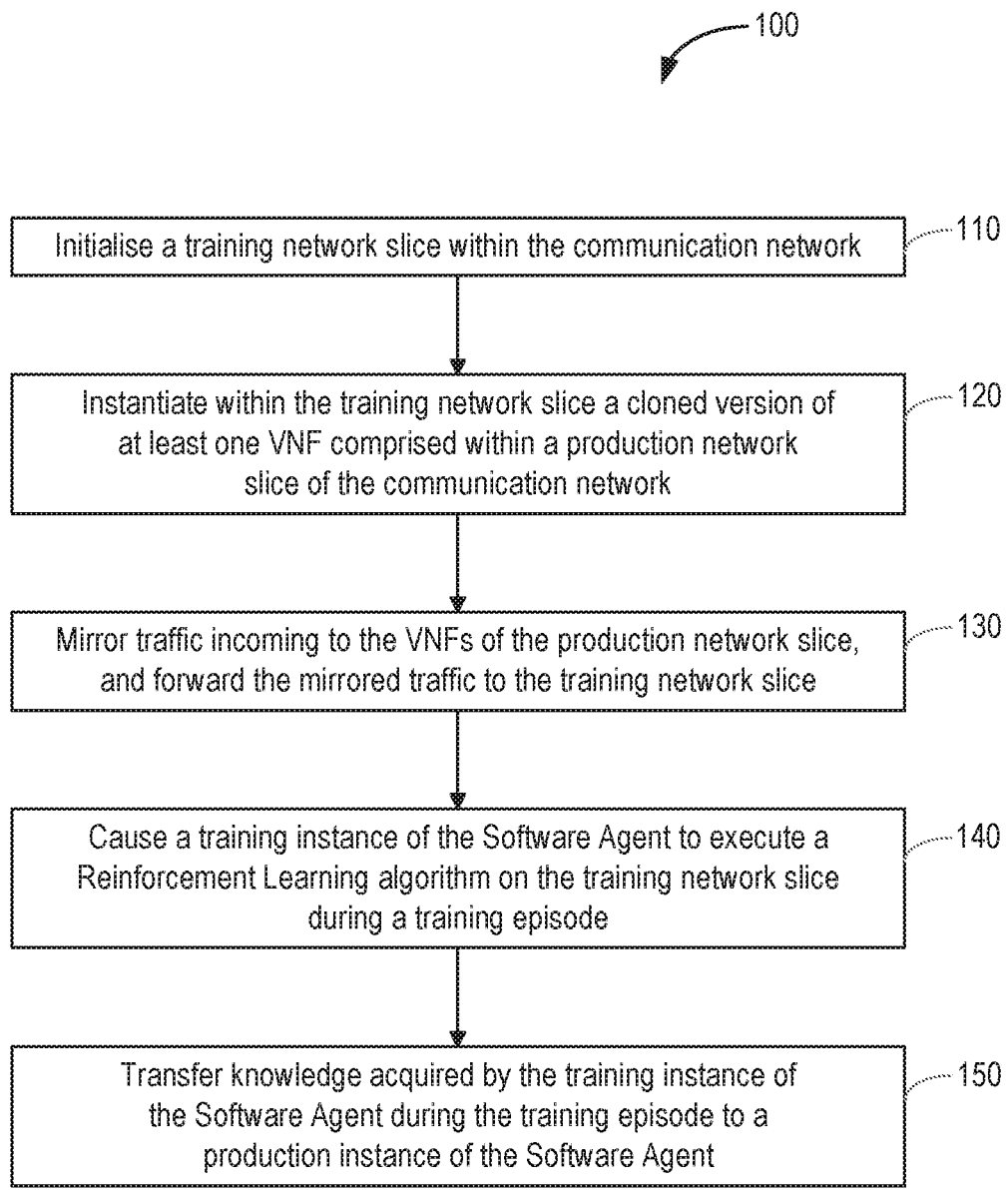
FIG. 1 is a flow chart illustrating process steps in a method for training a Software Agent to control a communication network.

FIG. 1 illustrates process steps in a method 100 for training a Software Agent to control a communication network according to an aspect of the present disclosure. The communication network may be a 3GPP network such as an LTE network, or may be a Next Generation (NG) network, and comprises at least one VNF. Referring to FIG. 1, in a first step 110, the method comprises initialising a training network slice within the communication network. In step 120, the method 100 then comprises instantiating within the training network slice a cloned version of at least one VNF comprised within a production network slice of the communication network. In step 130, the method 100 comprises mirroring traffic incoming to the VNF(s) of the production network slice, and forwarding the mirrored traffic to the training network slice. The method 100 then comprises, at step 140, causing a training instance of the Software Agent to execute a Reinforcement Learning algorithm on the training network slice during a training episode, and, in step 150, transferring knowledge acquired by the training instance of the Software Agent during the training episode to a production instance of the Software Agent.

Cloning a VNF comprised in a production network slice into a training network slice enables an exact replica of at least a part of a production network slice to be generated, and mirroring traffic incoming to the VNF(s) of the production network slice ensures that the training network slice recreates conditions in the production network slice. The training network slice thus recreates system configuration, characteristics and traffic load from the production network slice, and so provides an accurate representation of a live system to allow for meaningful training of a Software Agent. As the training network slice is separate from the production network slice, the operation of the production network slice will not be affected by the execution of a reinforcement learning algorithm on the training network slice, and aggressive exploration of the training network slice may be performed without risk of negative impact on the production network slice. A more complete training of the Software Agent may thus be achieved, not only enabling the Software Agent to aggressively explore for optimised policies but also to train for unusual or service critical situations including traffic spikes, line-card or connection failures and misconfigurations.

In some examples of the method 100, multiple training slices may be initialised and then used to provide faster training. For example, the same cloned VNFs could be instantiated in multiple training slices, with traffic mirrored to all training slices and individual training instances of the Software Agent carrying out Reinforcement Learning algorithms on the training slices during one or more training episodes. This may allow for different portions of the State-Action space to be explored in each training network slice, so providing faster insights which may be transferred to the production instance of the software agent. In further examples, different VNFs may be cloned and instantiated in different training slices, with appropriate traffic for the cloned VNFs being mirrored into each of the different training slices. In this manner, training for management of different parts of the production network slice may be performed concurrently. The following discussion with reference to FIGS. 2 to 6 uses the example of a single training network slice for clarity, but it will be appreciated that in each of the implementations and example methods discussed below, multiple training network slices may be initialised and used as described for the single training network slice, in order to provide for increased training opportunities and faster training, as discussed above.

Figure 2:
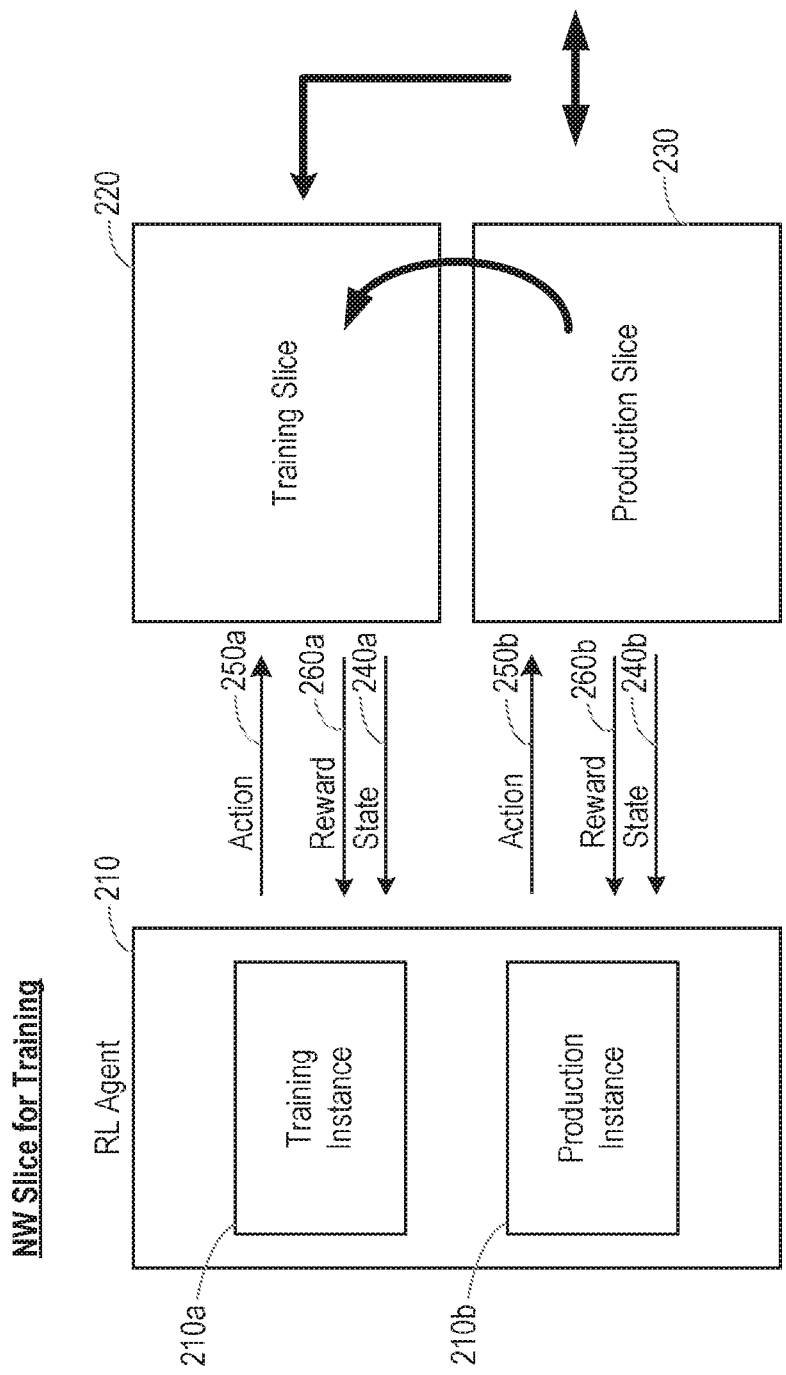
FIG. 2 is a block diagram illustrating implementation of an example of the method of FIG. 1.

FIG. 2 is a block diagram illustrating implementation of an example of the method 100 in a communication network. In the illustrated example implementation, a production slice 230 of the communication network is controlled by a production instance 210b of a Software Agent 210. The production instance 210b of the Software Agent 210 may conduct reinforcement learning using a purely exploitation strategy, selecting Actions 250b to be performed on the production slice 230 with the aim of maximising expected Reward 260b. Action selections are based on information regarding the State 240b of the production network slice 230 provided to the production instance 210b of the Software Agent 210, and result in Reward 260b which is also communicated to the production instance 210b. At a time t, one or more VNFs in the production slice 230 are cloned into a training slice 220 and traffic mirroring is established. The traffic mirroring may be only one way, mirroring traffic arriving at the production slice into the training slice. Traffic exiting the training network slice 220 may simply be dropped, ensuring that the training network slice 220 is unable to affect other parts of the network. The training network slice is controlled by a training instance 210a of a Software Agent 210. The training instance 210a of the Software Agent 210 may conduct reinforcement learning using an exploration strategy, which may in some examples be a highly aggressive exploration strategy, selecting Actions 250b to be performed on the production slice 230 with the aim of exploring a maximum of the State/Action space for the training network slice 220. Action selections are based on information regarding the State 240b of the training network slice 220 provided to the training instance 210a of the Software Agent 210, and result in Reward 260a which is also communicated to the training instance 210a. While Actions selected by the training instance 210a may not lead to increased Reward in the short term, they may allow the training instance 210a to explore different options, and thus not only learn appropriate behaviour for more unusual situations but also ensure that the instance does not remain stuck in a local optimum when a better, global optimum may be available.

Figure 3A:
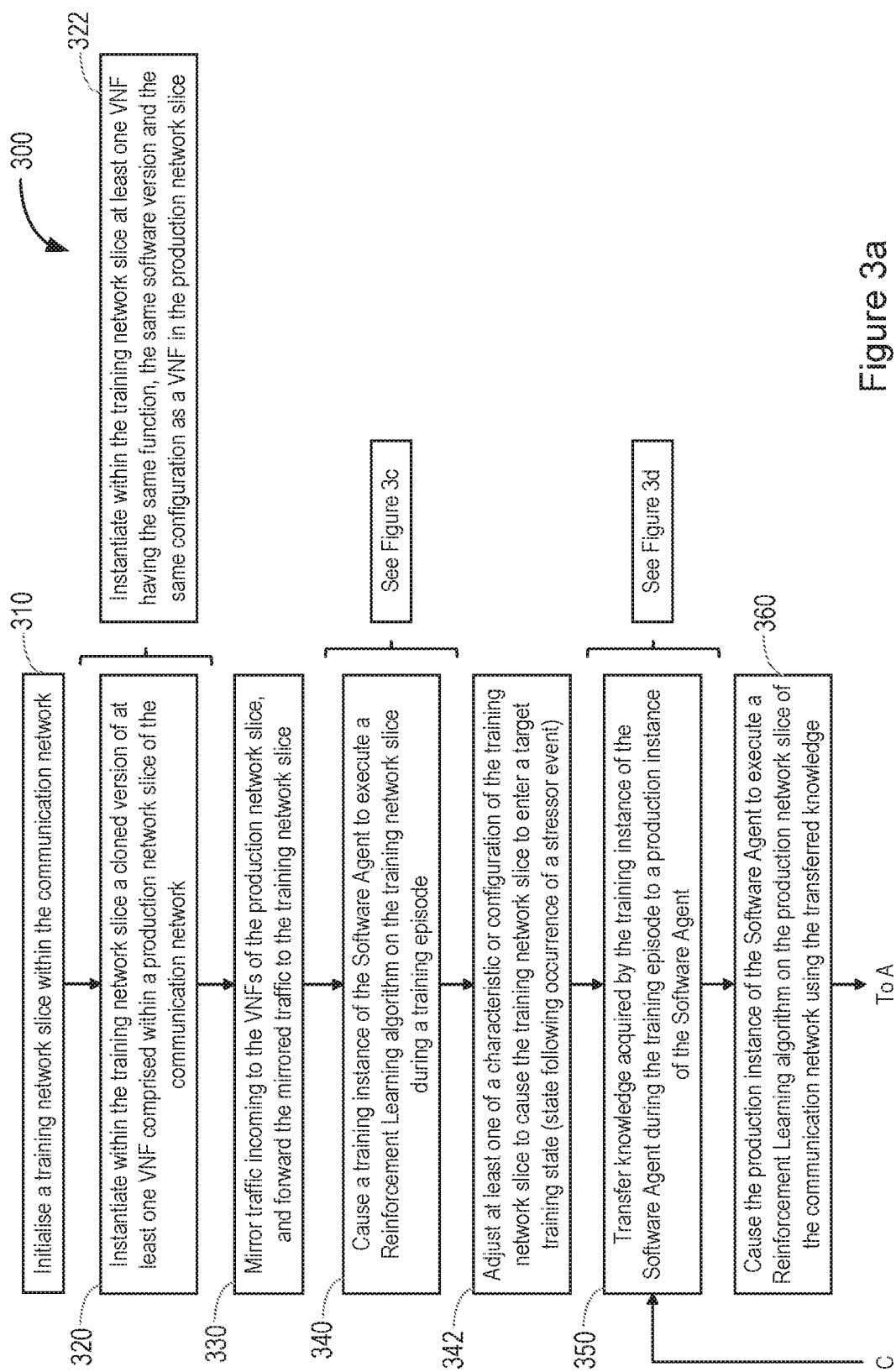
FIGS. 3a to 3d are flow charts illustrating process steps in another example of a method for training a Software Agent to control a communication network.

FIGS. 3a to 3d illustrate process steps in another example of method 300 for training a Software Agent to control a communication network. As for the method 100 above, the communication network to be controlled by the Software Agent comprises at least one VNF. The steps of the method 300 illustrate one example way in which the steps of the method 100 may be implemented and supplemented to achieve the above discussed and additional functionality. Referring initially to FIG. 3a, in a first step 310, the method 300 comprises initialising a training network slice within the communication network. The method then comprises, at step 320, instantiating within the training network slice a cloned version of at least one VNF comprised within a production network slice of the communication network. As illustrated at step 322, this may comprise instantiating within the training network slice at least one VNF having the same software version, the same configuration and the same data set as a VNF in the production network slice. In some examples, all VNFs in the production slice may be cloned into the training slice to create a complete replica of the production slice. In other examples, one a few or only one VNF may be cloned. For example, if it is desired to train the Software Agent on the management of one particular subsystem or function in the production slice, then cloning only that or those VNFs may be sufficient to provide useful training of the Software Agent. For example, if it is desired to train a Software Agent in the control of a packet core or an Information Management System (IMS), then the training network slice may contain only the VNFs providing these subsystems.

In step 330, the method 300 comprises mirroring traffic incoming to the VNF(s) of the production slice and forwarding the mirrored traffic to the training network slice. The traffic mirroring may take place at a data center gateway, or at appropriate interfaces, depending upon the number and nature of the VNFs cloned into the training network slice. The mirroring of traffic may be continuous over a training episode, such that the mirrored traffic flows continuously into both the production and training network slice. In order to maintain the training network slice as completely separate from the rest of the communication network, traffic out of the training network slice may be dropped.

In step 340, the method 300 comprises causing a training instance of the Software Agent to execute a reinforcement learning algorithm on the training network slice during a training episode. As discussed above, this may comprise causing a training instance of the Software Agent to apply a policy of a Reinforcement Learning algorithm to the training network slice. The steps involved in executing a reinforcement learning algorithm are illustrated in further detail in FIG. 3c. Referring to FIG. 3c, executing a reinforcement learning algorithm may involve establishing a State of the training network slice in step 342. The State of the training network slice may be represented by the states of the one or more VNFs instantiated in the training network slice. In communication systems, VNF states usually comprise information about the health of the system. This may include system performance indicators such as traffic load, data throughput, signalling traffic, packet delay and jitter. Other information about the health of the system may include service indicators including number of dropped calls, number of dropped packets, and/or quality of service parameters. Resource usage such as buffer queue size, number of used processing units, size and number of virtual machines, CPU and memory load may also provide information about the health of the system contributing to the State of the training network slice. Other information may also be envisaged to convey a State of the training network slice.

Having established a State of the training network slice in step 342, executing a reinforcement learning algorithm may comprise, in step 344, selecting an Action to be performed on the training network slice as a function of the established State. The Action may be selected from a set of Actions available to the Software Agent. Actions may vary according to the nature of the VNFs instantiated in the training network slice, but example Actions may be resource related, including for example increasing/decreasing allocation of resources including CPU, Memory, number and size of virtual machines, and/or number of processing boards. Other example Actions may include blocking/de-blocking, throttling, Quality of Service parameter changes, configuration changes, movement of traffic, subscribers, and/or virtual machines, or other Actions. As discussed above, the selection of an Action may be guided by a policy of the Reinforcement Learning algorithm that is applied to the training network slice. The policy may comprise a mapping from a State of the training network slice and an available action to a probability that the Action will be selected when the training network slice is in the State. Executing a reinforcement learning algorithm may then comprise, in step 346, causing the selected Action to be performed in the training network slice and, in step 348, receiving Reward as a consequence of the action performed. The Reward generated by performing the Action may be calculated by a Reward function, and provides the incentive for the Software Agent to select particular Actions. The Reward function thus greatly affects the optimisation strategy and policy that the Software Agent will select, and should be tailored to support the ultimate goal of the communication network operator. This goal may be of a business and/or technical nature, and Reward for a given Action may for example be limit based, involving keeping to Service Level Agreements (SLAs), or operating on/over/under a certain limit for one or more network parameters. In other examples, the Reward may relate to optimisation; minimising resource usage or energy usage, optimising capacity or distribution. Other Rewards could be time based, or relate to reaching a certain size.

The transition from State (St)-Action (At)-Reward (Rt)-State (St+1) can be modelled as a Markov Decision Process as set out below:

$$R_t = r_{t+1} + \gamma r_{t+2} = \gamma^2 r_{t+3} + \gamma^3 r_{t+4} L$$
$$= r_{t+1} + \gamma(r_{t+2} = \gamma r_{t+3} + \gamma^2 r_{t+4} L)$$
$$= r_{t+1} + \gamma R_{t+1}$$

With the goal being to find a policy $\pi$ that maximises the expected sum of Reward, that is to optimise the long term Value Function V:

$$V^\pi(s) = E_\pi\{R_t \mid s_t = s\}$$
$$= E_\pi\{r_{t+1} + \gamma V(s_{t+1}) \mid s_t = s\}$$

The Value Function V is discussed in further detail below.

As discussed above with reference to FIG. 2, and also in further detail below, a production instance of the Software Agent may employ a purely exploitation strategy in controlling the production network slice, always selecting an Action based on maximising the expected Reward given the current State of the slice. In contrast, the training instance of the Software Agent may employ a strategy which prioritises exploration. Without the need to consider potential negative impacts on service performance, the training instance can prioritise exploring the State/Action space of the training slice in order to attempt to find a globally optimised policy for selection of Actions given a particular state. This may be implemented through the use of an epsilon factor. An epsilon factor defines a probability with which the Software Agent will select a random Action to be performed on a system being controlled by the Software Agent, as opposed to an Action determined from previous learning to provide a highest Reward given the current State of the system. Using an epsilon factor allows for testing of different actions to determine whether, even if those actions will not provide the greatest Reward in the short term, they might lead to an improved policy which will generate higher Reward over the long term.

Referring again to FIG. 3c, executing a reinforcement learning algorithm may comprise, in step 340a, using an epsilon factor when executing the reinforcement learning algorithm on the training slice. In some examples, the epsilon factor may be relatively high, representing an aggressive exploration strategy with a high possibility of selecting a random Action at each decision. This may allow for a relatively fast exploration of the State/Action space. The epsilon factor may be used in an epsilon greedy algorithm, although other exploration algorithms may also be used. During performance of the reinforcement learning algorithm during the training episode, the method may comprise checking for occurrence of a trigger event at step 340b and, if a trigger event has occurred, applying a jumping factor within the training network slice at step 340c. Applying a jumping factor within the training network slice may comprise causing a change of configuration within the training network slice which change extends beyond the scope of any one Action in a set of Actions available to the Software Agent. The change of configuration caused by the jumping factor may be achievable through repeated application of Actions available to the Software Agent or may be unachievable using Actions alone. Example configuration changes that may be caused by the jumping factor may include instantiating another VNF or a different VNF, pooling VNFs, creating another Virtual Machine, changing VM configuration (for example, scaling up/down CPU or memory) etc. Applying the jumping factor effectively reboots the reinforcement learning algorithm by effecting a more radical change within the training network slice than can be achieved using a single Action, restarting the incremental changes caused by repeated Actions from a new starting point. As mentioned above, the change caused by a jumping factor may be achievable through repeated Actions, and may therefore simply represent a compression of the time in which such a change is implemented. In other examples the configuration change may be unachievable through the Actions available to the Software Agent, and may thus represent an opportunity to explore a part of the State/Action space of the training network slice that would otherwise be unavailable to the Software Agent.

The trigger event for applying the jumping factor may for example be a change in the value of any State parameter that is greater than a threshold value. The threshold value may be a percentage value, for example 10%. Such a change in a parameter value may indicate a significant event in the training network slice, which event may have been unforeseen, and may therefore justify making a significant change in the exploration strategy, restarting the exploration from a different point in the State/Action space of the training network slice.

In some examples, a restart configuration to which the training network slice may be set on triggering of the jumping factor may be maintained in a memory. The restart configuration may for example represent a configuration which is considered to be "good" or to represent a generally favourable setup for normal operation. The jumping factor may thus enable the training network slice to be reset to this "good" configuration on occurrence of a trigger event. In further examples, application of the jumping factor may cause the training network slice to be reset to the current production network slice configuration.

Referring again to FIG. 3a, the method 300 further comprises, in step 342, adjusting at least one of a characteristic or configuration of the training network slice to cause the training network slice to enter a target training state. The target training state may be a state following occurrence of a stressor event such as a failure event or an abnormal traffic event, including for example link breaks, buffer overflow, node restart, traffic spikes, function failure and/or a Distributed Denial of Service (DDOS) attack. In this way, the training network slice may be manipulated to confront the Software Agent with unusual situations and allow the Software Agent to explore State/Action pairs associated with such situations and learn how best to react to bring the controlled system back to a more normal state.

In step 350, the method 300 comprises transferring knowledge acquired by the training instance of the Software Agent during the training episode to a production instance of the Software Agent. One example of how this may be accomplished is illustrated in FIG. 3d. Referring to FIG. 3d, in a first step 352, transferring knowledge may comprise comparing a measure of a policy applied by the training instance of the Software Agent to the same measure of a policy applied by the production instance of the Software Agent. As discussed above, a policy applied by an instance of the Software Agent may comprise a mapping from a State of the system controlled by the instance and an Action which may be performed by the instance on the system to a probability that the instance will select the Action when the system is in the State. If the comparison indicates that the policy applied by the training instance of the Software Agent represents an improvement over the policy applied by the production instance of the Software Agent (step 354), transferring knowledge may comprise updating the policy applied by the production instance of the Software Agent to reflect that applied by the training instance of the Software Agent. The measure of the policies applied by the training and production instances of the Software Agent may in some examples be a Value Function, as discussed in further detail below.

Figure 3B:
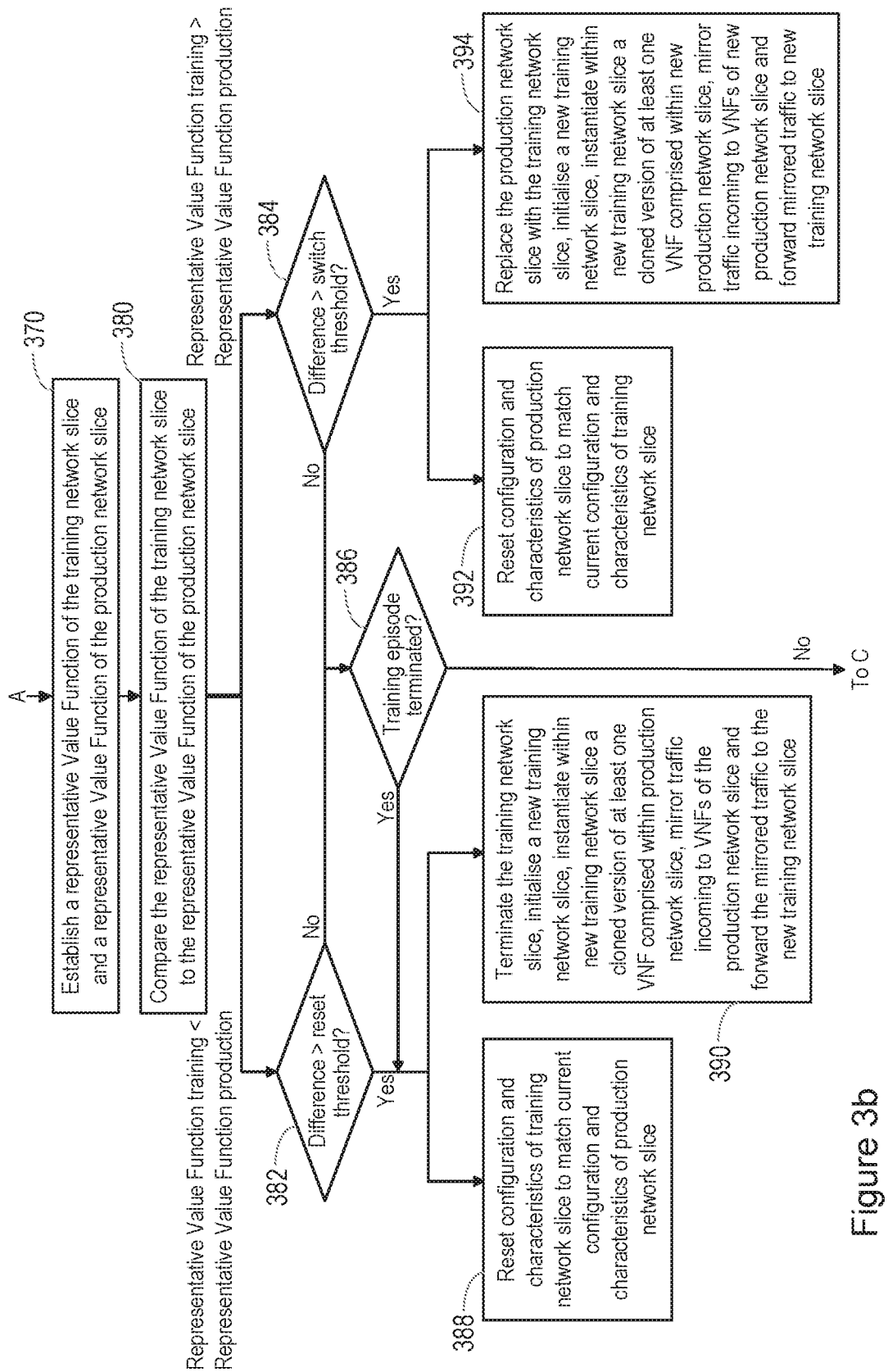
Figure 3C:
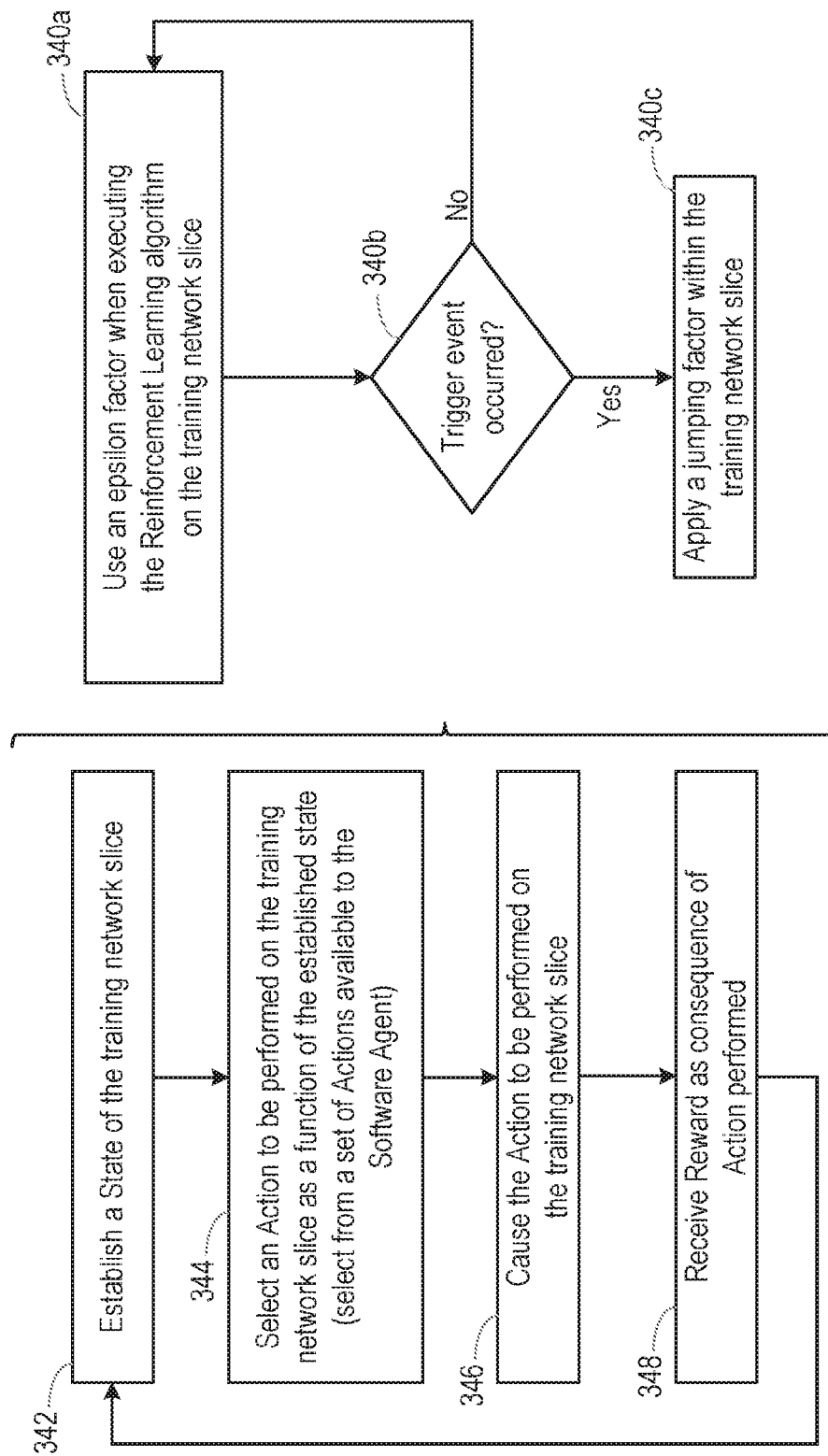
Figure 3D:
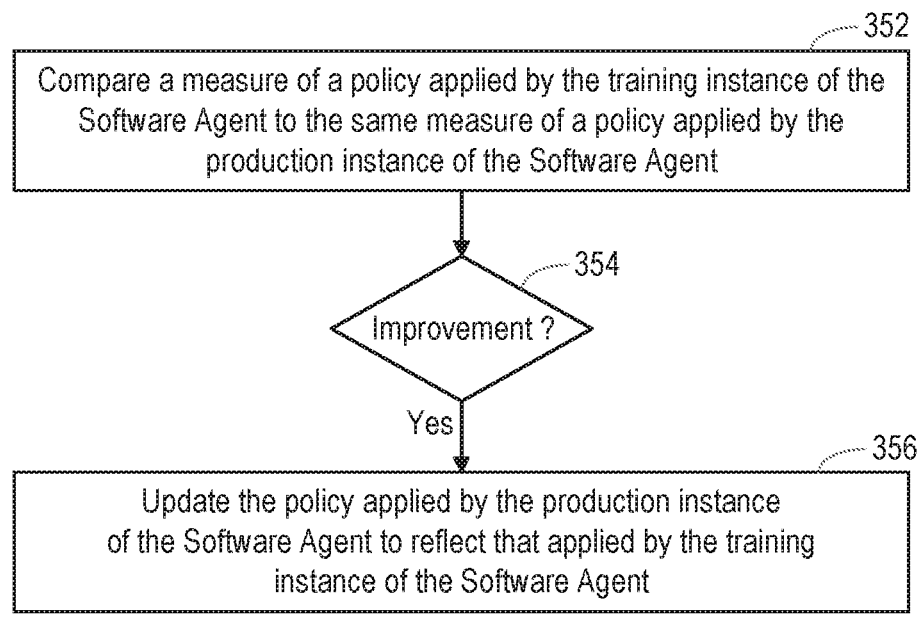

Referring now to FIG. 3b, the method 300 may further comprise establishing a representative Value Function of the training network slice and a representative Value Function of the production network slice in step 370, and comparing the representative Value Function of the training network slice to the representative Value Function of the production network slice in step 380.

A Value Function of a network slice may comprise an indication of cumulative expected Reward given the current State of the network slice and a policy applied by an instance of the Software Agent controlling the network slice, on the assumption that the instance of the Software Agent acts optimally according to the policy, that is selecting the Action that results in the highest expected sum of Reward. The Value Function thus reflects the current state of the relevant network slice as well as the likely effect, in terms of cumulative Reward, of the policy being applied by the instance of the Software Agent controlling the relevant network slice. The cumulative expected reward may be estimated over a time window which may vary according to use case, for example from hours to days. The time window over which the cumulative expected reward is estimated may in some examples be significantly longer than the duration of a training episode, but may reflect the projected cumulative reward in the event that the training episode was continued.

Establishing a representative Value Function may allow examples of the method 300 to account for short term variation in instantaneous values of a Value Function. The Value Function of a network slice, and particularly of the training network slice, may be unstable, varying considerably as exploration of the training network slice is performed.

Establishing a representative Value Function of a network slice may therefore comprise comparing an instantaneous Value Function with at least one previous Value Function, establishing a trend from the compared value functions, establishing a converged Value Function from the trend, and setting the converged Value Function as the representative Value Function.

The comparison step 380 may be performed periodically and/or may be performed following occurrence of particular events. For example, it may be desirable to compare representative Value Functions a particular time limit after application of the jumping factor in step 340c. As discussed above, application of the jumping factor, results in a more radical configuration change than would be caused by a single Action. In some examples, application of the jumping factor may change the configuration of the training network slice so significantly that it no longer provides a sufficiently close representation of the production network slice to provide useful training. This would be reflected in the different representative Value Functions. According to similar reasoning, it may be desirable to compare representative Value Functions a particular time limit after manually adjusting the training network slice in step 342. As discussed above, this may involve causing the training network slice to enter a state recreating conditions after a stressor event such as a failure event. Having enabled the training instance of the Software Agent to learn a suitable policy for dealing with such an event, the training network slice may no longer offer useful training, being in a state that is significantly different from the production network slice. It may therefore be appropriate to compare representative Value Functions in order to determine appropriate next steps, as discussed below.

If the comparison at step 380 indicates that the representative Value Function of the training network slice is less than the representative Value Function of the production network slice, the method 300 comprises checking whether the difference is greater than a reset threshold in step 382. If the difference between the representative Value Functions is greater than a reset threshold, the method 300 comprises performing at least one of step 388 or 390. Step 388 comprises resetting configuration and characteristics of the training network slice to match current configuration and characteristics of the production network slice. Step 390 comprises terminating the training network slice, initialising a new training network slice within the communication network, instantiating within the new training network slice a cloned version of at least one VNF comprised within the production network slice, mirroring traffic incoming to the VNFs of the production network slice and forwarding the mirrored traffic to the new training network slice. Step 390 thus terminates the original training network slice and replaces it with a new training network slice, re-cloning the appropriate VNFs.

If the comparison at step 380 indicates that the representative Value Function of the training network slice is greater than the representative Value Function of the production network slice, the method 300 comprises checking whether the difference is greater than a switch threshold in step 384. If the difference between the representative Value Functions is greater than a switch threshold, the method 300 comprises performing at least one of step 392 or 394. Step 392 comprises resetting configuration and characteristics of the production network slice to match current configuration and characteristics of the training network slice. Step 390 comprises replacing the production network slice with the training network slice, initialising a new training network slice within the communication network, instantiating within the new training network slice a cloned version of at least one VNF comprised within the new production network slice, mirroring traffic incoming to the VNFs of the new production network slice and forwarding the mirrored traffic to the new training network slice. Thus in step 394 the training network slice actually becomes the production network slice, and a new training network slice is created.

If the difference between the representative Value Functions is smaller than the reset threshold or the switch threshold, as appropriate (No in either of steps 382 or 384), the method 300 comprises checking whether or not the training episode for the current training network slice has ended in step 386. If the training episode has not yet ended, then the training and production instances continue to control their respective slices, executing appropriate reinforcement learning algorithms, and the method returns to then 350, transferring knowledge acquired by the training instance of the Software Agent to the production instance, and performing subsequent steps as outlined above.

If, at step 386, it is determined that the training episode has ended, the method 300 comprises performing at least one of steps 388 or 390 as outline above. In brief, this involves either resetting the configuration and characteristics of the training network slice to match the current configuration and characteristics of the production network slice, or terminating the training network slice and creating a new training network slice.

Figure 4:
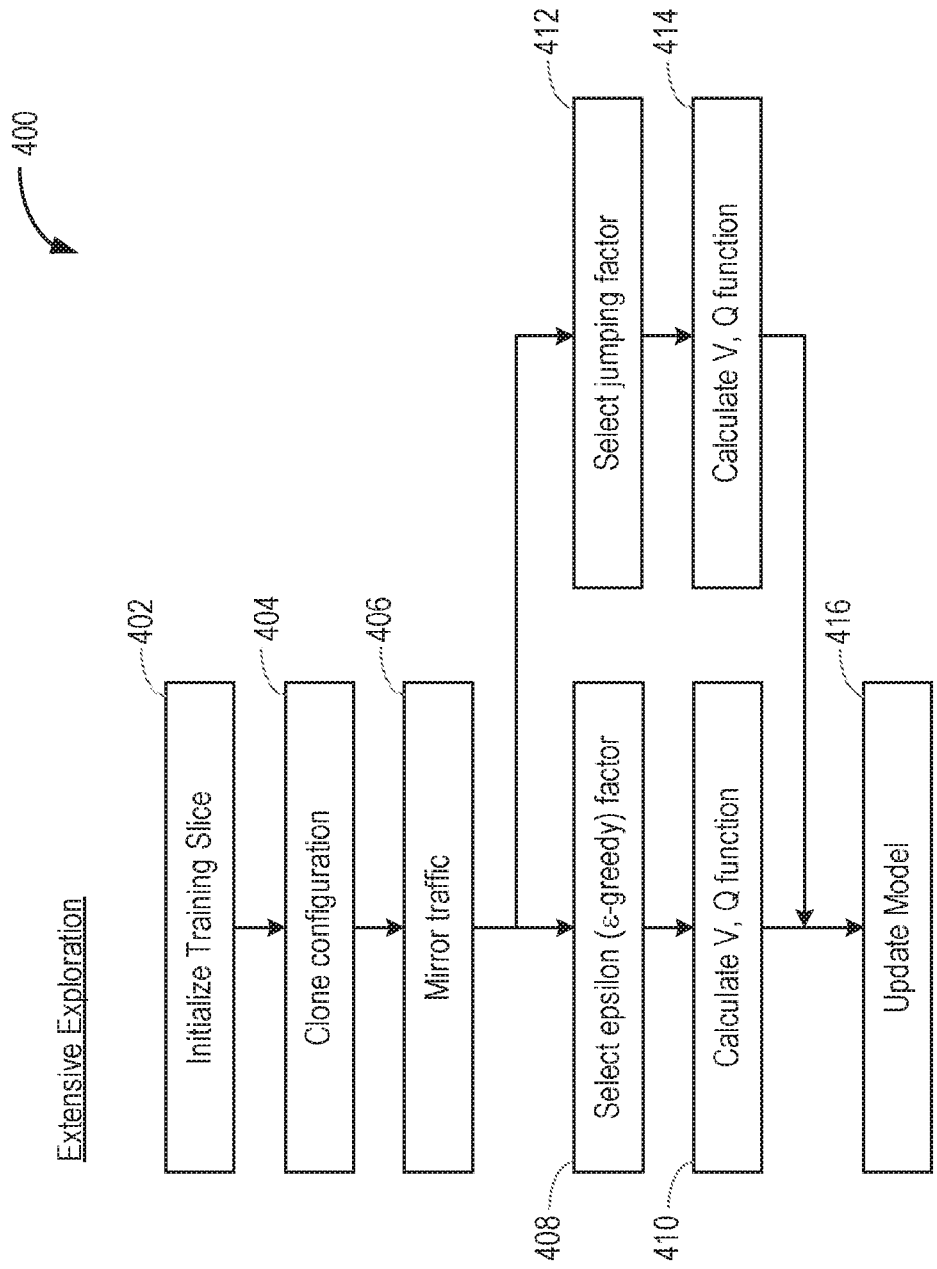
FIG. 4 is a flow chart illustrating an example implementation of a part of the method of FIGS. 3a to 3d.
Figure 5:
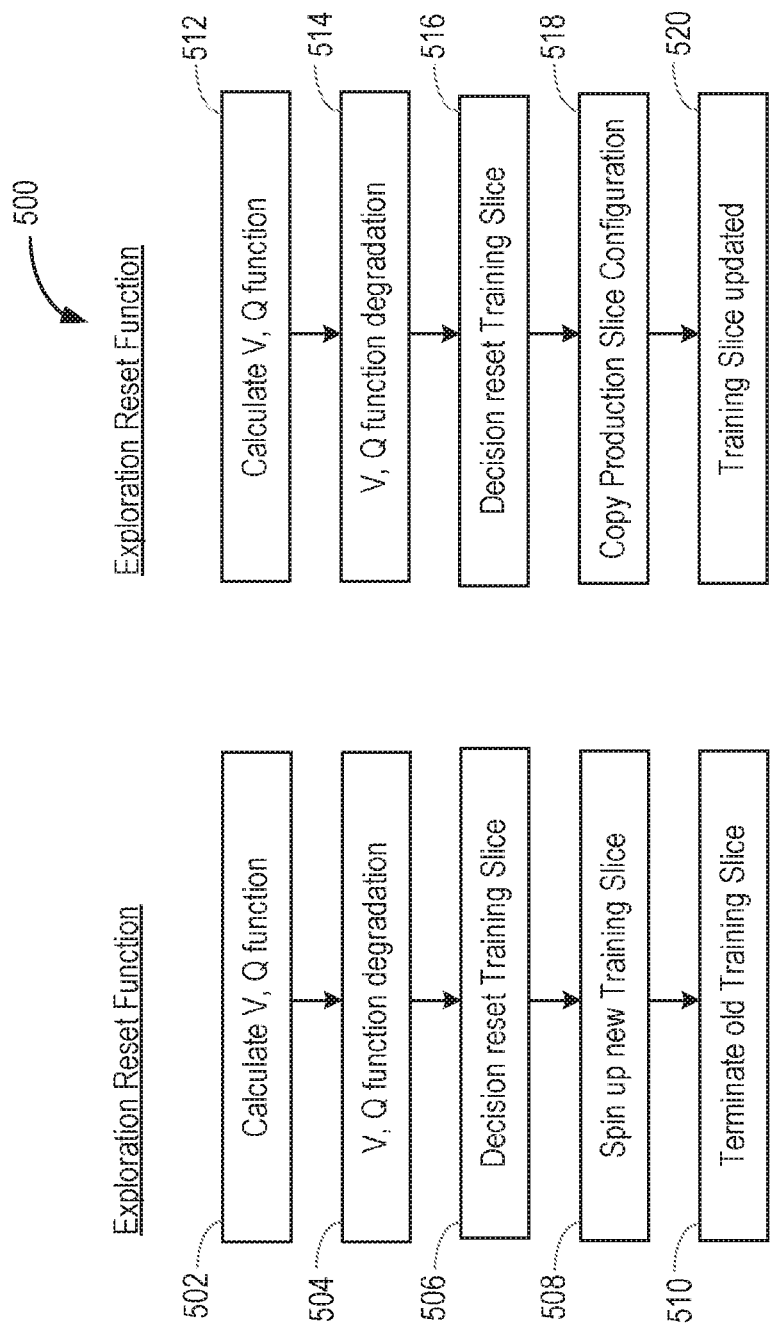
FIG. 5 is a flow chart illustrating an example implementation of another part of the method of FIGS. 3a to 3d.
Figure 6:
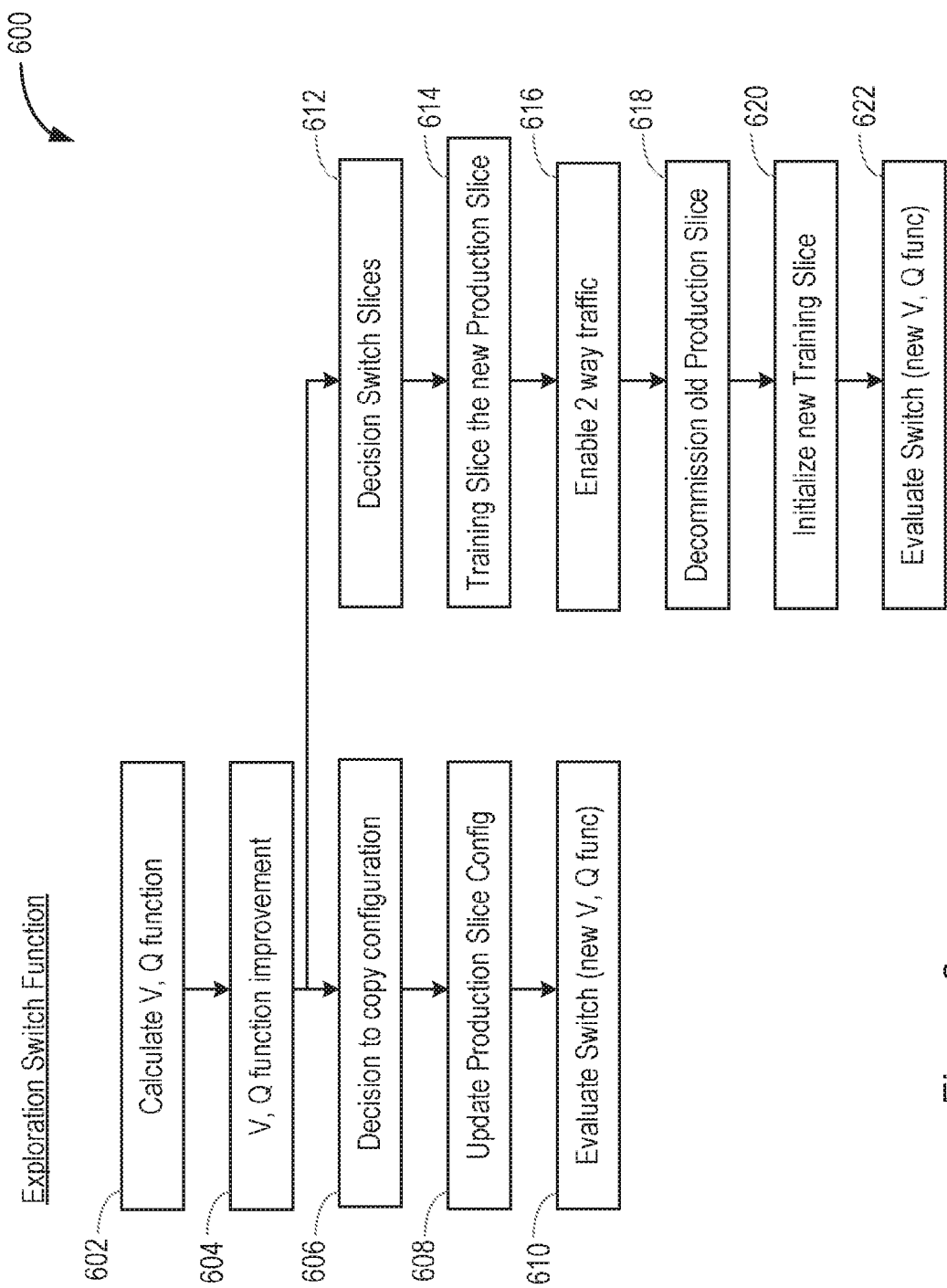
FIG. 6 is a flow chart illustrating an example implementation of another part of the method of FIGS. 3a to 3d.

Example implementations of parts of the method 300 are illustrated in FIGS. 4, 5 and 6. FIG. 4 illustrates an example implementation 400 of the extensive exploration which may be achieved using the training network slice. Extensive exploration refers to the ability to train the Software Agent for unforeseen events and rare situations, as well as the ability to explore a greater proportion of the possible State space for the controlled environment. Such extensive exploration is facilitated by the possibility to simulate rare or unusual situations and by the ability to perform fast exploration, for example through the use of a high epsilon factor and/or a jumping factor. Referring to FIG. 4, the training network slice is initialised in step 402 and the VNFs, including configuration details of the relevant production network slice, are cloned in step 404. Traffic incoming to the production network slice is then mirrored in step 406. An epsilon factor for an epsilon greedy algorithm is selected at step 408, allowing for calculation of a Value function V, and in some examples an Action-Value Function Q. As noted above, the Value Function V gives the expected sum of Reward for a system starting in State s and controlled by an Agent acting optimally; the Action-Value Function Q gives the expected sum of Reward for a system starting in State s and controlled by an Agent which first takes Action a and then acts optimally. Using an epsilon value allows for exploration of the training network slice, with a higher epsilon factor allowing for faster exploration. At any time while performing reinforcement learning, regardless of the reinforcement learning algorithm used, a jumping factor may be selected at step 412 to reboot the reinforcement learning algorithm, restarting the incremental changes caused by repeated Actions from a new starting point. Following application of the jumping factor, the Value Function V, and in some examples Action-Value Function Q may be calculated. Following calculation of the appropriate function or functions, the policy applied by a production instance of a Software Agent may be updated with knowledge acquired from the exploration of the training network slice by the training instance of the Software Agent.

FIGS. 5 and 6 illustrate example implementations of exploration reset and exploration switch which may be achieved using the training network slice. It will be appreciated that the training and production network slices will develop independently under the control of the training and production instances of the Software Agent. As a consequence of the exploration performed on the training network slice and the resulting different policies implemented by the training and production instances of the Software Agent, the training network slice will over time develop a different configuration and different characteristics to those of the production network slice.

In some cases, the training network slice may differ too greatly from the production network slice, such that it becomes questionable whether the training network slice still represents a realistic situation and so provides useful learning. It could be that a high exploration factor epsilon or a jumping factor creates a system configuration that is unstable or that cannot fulfil SLA requirements any longer. In such cases the Value function of the training network slice will become significantly degraded with respect to that of the production network slice, and the training network slice may be reset by copying the current production network slice configuration. If the differences between the training and production network slices are too great for resetting of the training network slice, or if resetting is not desired or possible for any other reason, the training network slice may be terminated and a new training network slice may be generated.

In other cases, the exploration performed on the training network slice may result in a training network slice configuration that is superior to that of the production network slice. In such cases, the exploration of the training network slice leads to a more optimal policy, and the policy learned by the training instance of the Software Agent leads to incremental changes that over time provide a better slice configuration and/or characteristics than in the production network slice. This may be reflected in a Value function of the training network slice which is significantly higher than that of the production network slice. In such a situation, the policy of the training instance of the Software Agent may be adopted by the production instance of the Software Agent. In addition, or if the differences between the training and production network slice configurations mean adoption of the training slice policy in the production slice is not possible, the production slice configuration and characteristics may be updated to reflect the superior configuration and characteristics of the training network slice. If such updating is not possible or not desired, then the training network slice may become the new production network slice, with the old production network slice being terminated and a new training network slice being generated.

FIG. 5 illustrates two example implementations 500 of the exploration reset which may be achieved using the training network slice. Referring to FIG. 5, following calculation of the V and/or Q functions in step 502 or 512 as discussed above with reference to FIG. 4, it may be established that these functions have experienced degradation with respect to the corresponding functions for the production network slice in step 504 or 514. If the degradation is sufficiently large (for example indicated by a difference in functions that is greater than a reset threshold as discussed above), a decision may be taken to reset the training network slice at step 506 or 516. In a first example, this may be achieved by creating a new training network slice in step 508 (for example by re-cloning appropriate VNFs from the production network slice) and terminating the old training network slice in step 510. In another example, the resetting of the training network slice may be achieved by copying the current production network slice configuration in step 518 and updating the training network slice to reflect the current configuration and characteristics of the production network slice.

FIG. 6 illustrates two example implementations 600 of the exploration switch which may be achieved using the training network slice. Referring to FIG. 6, following calculation of the V and/or Q functions in step 602 as discussed above with reference to FIG. 4, it may be established that these functions have experienced an improvement with respect to the corresponding functions for the production network slice in step 604. If the improvement is sufficiently large (for example indicated by a difference in functions that is greater than a switch threshold as discussed above), a decision may be taken either to copy the configuration of the training network slice over to the production network slice, in step 606, or to switch slices, such that the training network slice becomes the production network slice, in step 612. If a decision is taken to copy the configuration of the training network slice over to the production network slice in step 606 the production network slice configuration is updated in step 608 to match that of the training network slice. The effect of the update may then be evaluated in step 610 by calculating updated V and/or Q functions. If a decision is taken to switch slices in step 612, then the training network slice becomes the new production network slice in step 614. Two way traffic is enabled in step 616 (as opposed to dropping all traffic leaving the slice, as is the case for the training network slice). The old production network slice is decommissioned in step 618 and a new training network slice is initialised in step 620. Finally the switch from training slice to production slice may be evaluated at step 622 by calculating updated V and/or Q functions.

It will be appreciated that the V and/or Q functions discussed with reference to FIGS. 5 and 6 may be representative V and Q functions, as discussed above with reference to FIG. 3b.

Figure 7:
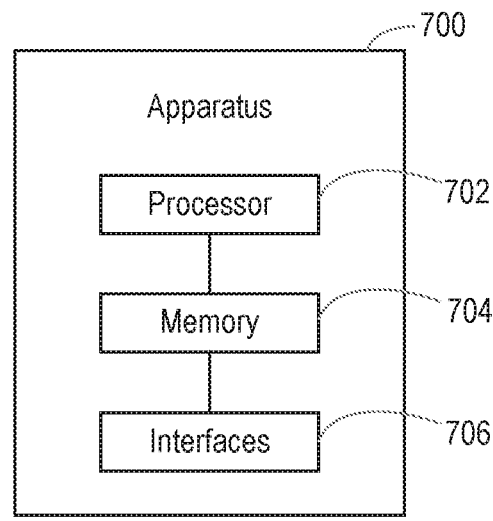
FIG. 7 is a block diagram illustrating functional elements in an apparatus for training a Software Agent to control a communication network.

The methods of the present disclosure may be conducted in an apparatus for training a Software Agent to control a communication network. FIG. 7 illustrates an example apparatus 700 which may implement the methods 100, 300, 400, 500 and/or 600 for example on receipt of suitable instructions from a computer program. Referring to FIG. 7, the apparatus 700 comprises a processor 702, a memory 704 and Interfaces 706. The memory 704 contains instructions executable by the processor 702 such that the apparatus 700 is operative to conduct some or all of the steps of the methods 100, 300, 400, 500 and/or 600.

Figure 8:
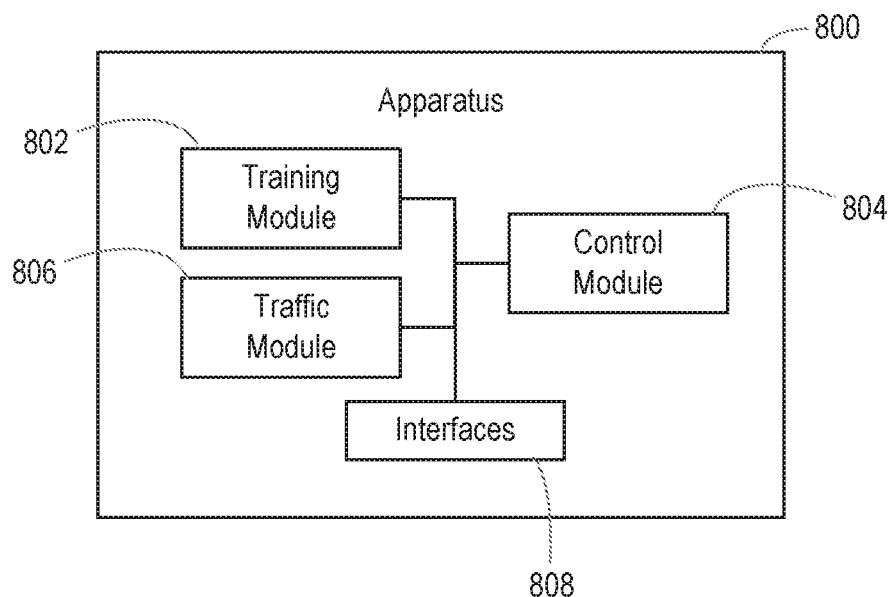
FIG. 8 is a block diagram illustrating functional elements in another example of apparatus for training a Software Agent to control a communication network.

FIG. 8 illustrates an alternative example apparatus 800, which may implement the methods 100, 300, 400, 500 and/or 600 for example on receipt of suitable instructions from a computer program. It will be appreciated that the units illustrated in FIG. 8 may be realised in any appropriate combination of hardware and/or software. For example, the units may comprise one or more processors and one or more memories containing instructions executable by the one or more processors. The units may be integrated to any degree.

Referring to FIG. 8, the apparatus 800 comprises a training module 802 for initialising a training network slice within the communication network and instantiating within the training network slice a cloned version of at least one VNF comprised within a production network slice of the communication network. The apparatus further comprises a traffic module 806 for mirroring traffic incoming to the VNFs of the production network slice, and forwarding the mirrored traffic to the training network slice, and a control module 804 for causing a training instance of the Software Agent to execute a Reinforcement Learning algorithm on the training network slice during a training episode, and for transferring knowledge acquired by the training instance of the Software Agent during the training episode to a production instance of the Software Agent. The apparatus may further comprise interfaces 808.

Aspects of the present disclosure thus provide methods and apparatus according to which a Software Agent may be trained to control a communication network using a reinforcement learning algorithm. This training may be achieved without negatively impacting the communication network, and without having to compromise between exploration and exploitation, through the use of a training network slice, which contains cloned versions of VNFs from a production network slice and has mirrored traffic from the production network slice. The training network slice thus provides an accurate recreation of the production network slice, but is isolated from the rest of the communication network, meaning actions taken in the training network slice cannot impact upon the functioning of the rest of the communication network. This isolation means that the training network slice may be used for far greater and more aggressive exploration of States and Actions than would be possible in a production system, in which such exploration would impact upon performance of the system, for example by creating system instabilities, degrading throughput and/or increasing packet and call drop. An exhaustive Tree Search or Monte Carlo sampling to the end of an episode in a production system are simply not possible. In contrast, in a training network slice according to aspects of the present disclosure, Temporal Difference sampling may be performed to enable a deeper backup of a system Value Function and so provide an improved policy. The extensive exploration facilitated by the use of a training network slice may be realised using for example an epsilon greedy algorithm with a relatively high value of epsilon, allowing for fast exploration and hence fast convergence to an optimal policy, and for significant changes in the system. In addition, the training network slice may be manually adjusted or manipulated to create extreme and/or unusual situations or traffic behaviour including traffic spikes or traffic impacting faults such as line-card failure, connection breaks or misconfigurations. Such manipulation effectively enlarges the State space available to the Software Agent for learning how to react to both usual and unusual behaviour.

It will be appreciated that examples of training network slice as discussed in the present disclosure provide an accurate recreation of a production environment, without the need for prior exploration of that environment, and without the approximations and high degree of domain knowledge and network engineering inherent in creation of a model.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for training a software agent ("SA") to control a communication network, the communication network comprising a plurality of virtualized network functions ("VNFs") the method comprising:
   initializing a training network slice within the communication network;
   instantiating within the training network slice a version of at least one VNF comprised within a production network slice of the communication network;
   mirroring traffic incoming to the VNFs of the production network slice;
   forwarding the mirrored traffic to the training network slice;
   causing a training instance of the SA to execute a reinforcement learning ("RL") algorithm on the training network slice during a training episode; and
   responsive to causing the training instance of the SA to execute the RL algorithm on the training network slice during the training episode, transferring information acquired by the training instance of the SA during the training episode to a production instance of the SA.

2. The method of claim 1, further comprising:
   causing the production instance of the SA to execute the RL algorithm on the production network slice of the communication network using the information.

3. The method of claim 1, wherein instantiating within the training network slice the version of the at least one VNF comprised within the production network slice of the communication network comprises instantiating within the training network slice the at least one VNF having a same function, a same software version, and a same configuration as a VNF in the production network slice.

4. The method of claim 1, wherein causing the training instance of the SA to execute the RL algorithm on the training network slice during the training episode comprises:
   establishing a state of the training network slice;
   selecting an action to be performed on the training network slice as a function of the state; and
   causing the action to be performed on the training network slice;
   wherein selecting the action to be performed on the training network slice as the function of the established state comprises selecting the action from a set of actions available to the SA.

5. The method of claim 1, wherein causing the training instance of the SA to execute the RL algorithm on the training network slice during the training episode comprises:
   using an epsilon factor when executing the RL algorithm on the training network slice,
   wherein the epsilon factor defines a probability with which the SA will select a random action to be performed on a system the communication network being controlled by the SA, as opposed to an action determined prior to the training episode, to provide a highest reward given a current state of the communication network.

6. The method of claim 5, wherein causing the training instance of the SA to execute the RL algorithm on the training network slice during the training episode further comprises:
   determining a threshold value for acceptable values of the epsilon factor for use in controlling the production network slice of the communication network,
   wherein using the epsilon factor comprises selecting the epsilon factor to be above the threshold value.

7. The method of claim 1, wherein causing the training instance of the SA to execute the RL algorithm on the training network slice during the training episode comprises:
   checking for occurrence of a trigger event; and
   responsive to occurrence of the trigger event, applying a jumping factor within the training network slice,
   wherein applying the jumping factor within the training network slice comprises causing a change of configuration within the training network slice, the change extending beyond the scope of any one action in a set of actions available to the SA.

8. The method of claim 7, wherein the trigger event comprises a change in the value of any state parameter that is greater than a threshold value.

9. The method of claim 1, further comprising:
   during the training episode, adjusting at least one of a characteristic or a configuration of the training network slice to cause the training network slice to enter a target training state.

10. The method of claim 9, wherein the target training state comprises a state following occurrence of a stressor event, the stressor event comprising at least one of a failure event and an abnormal traffic event.

11. The method of claim 1, wherein transferring the information acquired by the training instance of the SA during the training episode to the production instance of the SA comprises:
   comparing a measure of a policy applied by the training instance of the SA to a measure of the policy applied by the production instance of the SA; and
   responsive to determining that the policy applied by the training instance of the SA represents an improvement over the policy applied by the production instance of the SA, updating the policy applied by the production instance of the SA to reflect the policy applied by the training instance of the SA,
   wherein the policy applied by the training instance and the production instance of the SA each comprise a mapping from a state of the communication network controlled by an instance and an action, which may be performed by the instance on the communication network to a probability that the instance will select the action when the communication network is in the state.

12. The method of claim 2, further comprising:
   establishing a representative value function ("VF") of the training network slice and a representative VF of the production network slice;
   comparing the representative VF of the training network slice to the representative VF of the production network slice; and
   responsive to the representative VF of the training network slice being less than the representative VF of the production network slice, and the difference between the representative VF being greater than a reset threshold, performing at least one of:
      resetting configuration and characteristics of the training network slice to match current configuration and characteristics of the production network slice; and
      terminating the training network slice,
      initializing a new training network slice within the communication network,
      instantiating within the new training network slice a version of at least one VNF comprised within the production network slice,
      mirroring traffic incoming to the VNFs of the production network slice, and
      forwarding the mirrored traffic to the new training network slice.

13. The method of claim 2, further comprising:
   establishing a representative VF of the training network slice and a representative VF of the production network slice;
   comparing the representative VF of the training network slice to the representative VF of the production network slice; and
   responsive to the representative VF of the training network slice being greater than the representative VF of the production network slice and the difference between the representative VF being greater than a switch threshold, performing at least one of:
      resetting configuration and characteristics of the production network slice to match current configuration and characteristics of the training network slice; and
      replacing the production network slice with the training network slice,
      initializing a new training network slice within the communication network,
      instantiating within the new training network slice a version of at least one VNF comprised within the new production network slice,
      mirroring traffic incoming to the VNFs of the new production network slice, and
      forwarding the mirrored traffic to the new training network slice.

14. The method of claim 1, wherein a VF of a first network slice comprises an indication of cumulative expected reward given the current state of the first network slice and a policy applied by a first instance of the SA controlling the network slice.

15. The method of claim 1, further comprising:
   responsive to termination of the training episode, performing at least one of:
      resetting configuration and characteristics of the training network slice to match current configuration and characteristics of the production network slice; and
      terminating the training network slice,
      initializing a new training network slice within the communication network,
      instantiating within the new training network slice a version of at least one VNF comprised within the production network slice,
      mirroring traffic incoming to the VNFs of the production network slice, and
      forwarding the mirrored traffic to the new training network slice.

16. An apparatus for training a software agent ("SA") to control a communication network, the communication network comprising a plurality of virtualized network functions ("VNFs"), the apparatus comprising:
   a processor; and
   a memory, the memory having instructions stored therein that are executable by the processor to cause the apparatus to perform operations comprising:
      initializing a training network slice within the communication network;
      initiating within the training network slice a version of at least one VNF comprised within a production network slice of the communication network;
      mirroring traffic incoming to the VNFs of the production network slice;
      forwarding the mirrored traffic to the training network slice;
      causing a training instance of the SA to execute a reinforcement learning ("RL") algorithm on the training network slice during a training episode; and
      responsive to causing the training instance of the SA to execute the RL algorithm on the training network slice during the training episode, transferring information acquired by the training instance of the SA during the training episode to a production instance of the SA.

17. The apparatus of claim 16, wherein causing the training instance of the SA to execute the RL algorithm on the training network slice during the training episode comprises:
   checking for occurrence of a trigger event; and
   responsive to occurrence of the trigger event, applying a jumping factor within the training network slice,
   wherein applying the jumping factor within the training network slice comprises causing a change of configuration within the training network slice, the change extending beyond the scope of any one action in a set of actions available to the SA.

18. The apparatus of claim 17, wherein the trigger event comprises a change in the value of any state parameter that is greater than a threshold value.

19. The apparatus of claim 16, wherein causing the training instance of the SA to execute the RL algorithm on the training network slice during the training episode comprises:
using an epsilon factor when executing the RL algorithm on the training network slice,
wherein the epsilon factor defines a probability with which the SA will select a random action to be performed on a communication network being controlled by the SA, as opposed to an action determined prior to the training episode, to provide a highest reward given a current state of the communication network.

20. A non-transitory computer-readable medium having instructions stored therein that are executable by a processor in an apparatus to perform operations for training a software agent ("SA") to control a communication network including a plurality of virtualized network functions ("VNFs"), the operations comprising:
initializing a training network slice within the communication network;
initiating within the training network slice a version of at least one VNF comprised within a production network slice of the communication network;
mirroring traffic incoming to the VNFs of the production network slice;
forwarding the mirrored traffic to the training network slice;
causing a training instance of the SA to execute a reinforcement learning ("RL") algorithm on the training network slice during a training episode; and
responsive to causing the training instance of the SA to execute the RL algorithm on the training network slice during the training episode, transferring information acquired by the training instance of the SA during the training episode to a production instance of the SA.

* * * * *